(No Model.)
F. P. SHEPHERD.
MILK CAN.
No. 404,117. Patented May 28, 1889.
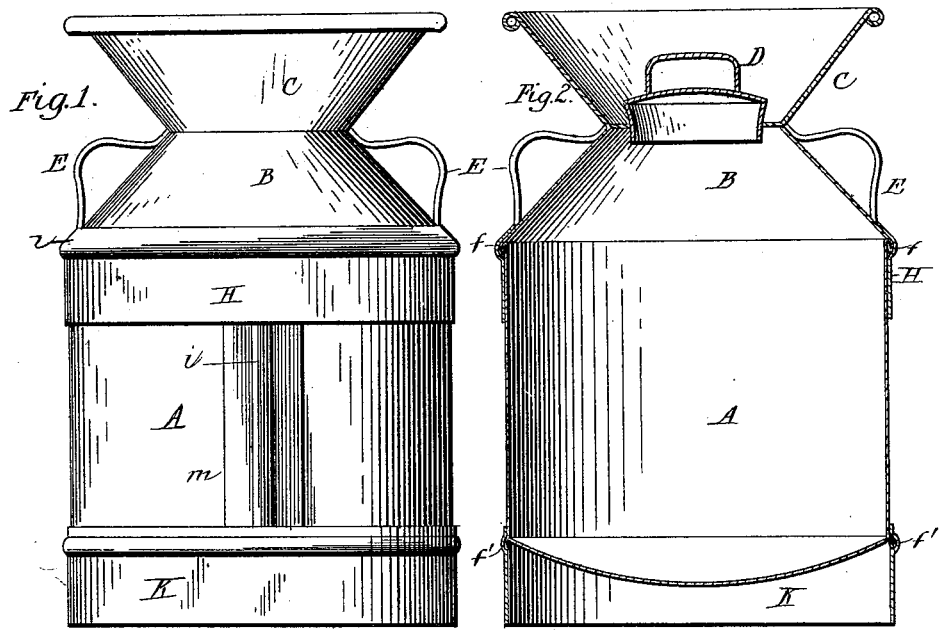
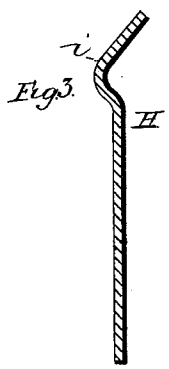
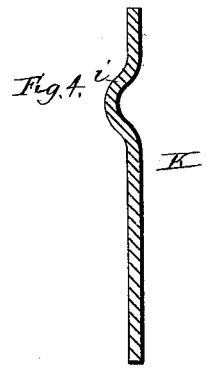
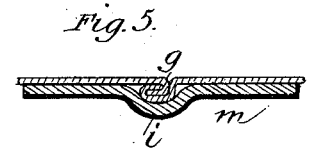
Witnesses,
Inventor,
Frank P. Shepherd
By his Attorneys,
John J. Halsted & Son

UNITED STATES PATENT OFFICE.

FRANK P. SHEPHERD, OF SOUTH ELGIN, ILLINOIS.

MILK-CAN.

SPECIFICATION forming part of Letters Patent No. 404,117, dated May 28, 1889.

Application filed March 23, 1889. Serial No. 304,414. (No model.)

*To all whom it may concern:*

Be it known that I, FRANK P. SHEPHERD, of South Elgin, in the State of Illinois, have invented certain new and useful Improvements in Milk-Cans; and I do hereby declare that the following is a full, clear, and exact description of the invention, which will enable others skilled in the art to which it appertains to make and use the same, reference being had to the accompanying drawings and to letters of reference marked thereon, which form a part of this specification.

The object of this invention is not only to protect and strengthen the cans, but also to protect them at the seams and to prevent the lodgment of any milk between the seams and the outer bands, which I employ for re-enforcing the seams.

Many railway-trains running into the large cities are laden entirely with milk-cans, and which are rapidly and roughly handled and knocked about, and from either terminus of their travel by rail they are frequently carried from one to fifteen miles on common roads, good and bad, in wagons, and often at night; hence their wear and tear is very great. Many ineffectual efforts have been made to render them able to withstand this rough usage for any considerable time. One of the greatest difficulties that this frequent banging about causes is the breaking open of their seams; and when this occurs the milk will be more or less "swashed" all over the can, and it will then get into even the minutest crevice in the broken seam or seams. The great damage resulting from this is, however, not confined merely to the expense and delay of repairing or replacing the can, nor to the mere loss of the milk which thus escapes, though this is serious enough; yet it is slight compared to the consequent continuing damage to the milk which may afterward be put into the same can, and which damage is caused as follows, viz: When the milk once enters the crevices of a broken seam, it cannot be all got out, not even by careful and constant washing or by any known means, for it insinuates itself into the minutest part of the fracture, and more or less of it will remain, defying any effort to remove it, and wherever it remains it not only, like all decaying animal matter, will emit a most offensive and intolerable odor, but it will also seriously affect and damage all milk afterward placed in such can, the milk in such crevice becoming what is styled "rotten" and full of maggots, which always breed in such cases. However often such damaged cans may be washed and however cleanly they may be kept to all visible appearance, yet it is found to be impossible to purify such broken seams or to wash behind the outer bands. Frequently, as cans are usually made, the seams get broken clear through, and then maggots and rotten milk will be found inside the can, and if the milk be then too filthy to be sold it must be thrown away, the producer losing it, and the freight both ways on the defective can and worthless contents is also lost.

At present every producer of milk transported by rail has from the above-named causes frequently to buy an entire new outfit of cans. It is this existing state of facts that has led to my present invention, the object of which is to furnish a milk-can for railway and other transportation with seams so protected that even with the rough usage that cans are subject to the seams cannot be broken, and consequently no milk can find its way and lodge where it cannot be got at, and they may be thoroughly cleansed every day and with no fear of the evil effects above named.

I will now more particularly describe my improvements, aided by the accompanying drawings, in which—

Figure 1 represents an elevation, and Fig. 2 a central vertical section, of a can made in accordance with my invention; Fig. 3, a cross-section, enlarged, of the upper re-enforcing and seam-protecting band; Fig. 4, a similar section of the lower re-enforcing and seam-protecting band; and Fig. 5, a similar section of a protecting-strip for the vertical seam.

A is the body of the tin can; B, its top portion, which I prefer to make conical; C, a funnel-shaped mouth above the same; D, the removable cover, and E E the handles.

I connect the body A to its top and also to its bottom by means of an external folded lap-seam, $f\ f'$, respectively, in a well-known manner, which, as is usual, may be done by machinery, as may also the similar folded vertical seam, $g$, of the body A. It is these seams, but more especially the annular or transverse ones $f\ f'$, that give most of the trouble above stated, as they receive most of the blows and shocks; and here I should also remark that it has heretofore been attempted to remedy the difficuly in some degree by having the annular folded joint project on the inside instead of on the outside of the can, and then re-enforce it by a flat band; but existing metal-folding machines used by tinsmiths are not adapted for making inwardly-turned seams, and it would be greatly too expensive, and therefore impracticable, to make them by hand. Besides, the flat re-enforcing band laid upon a flat surface of the can affords but a limited resistance against blows.

In my invention, therefore, I protect and re-enforce the external seam, $f$, by means of a specially-made broad metal band, H, which is itself strengthened and stiffened by a transverse arch composed of a grooved portion, $i$, this same groove or bead $i$ also being adapted to receive the seam $f$. This band above the bead $i$ is shaped like a section of a cone, that it may fit in part the form of the conical top of the can. Below the bead $i$ the band is cylindrical in form, and thus made this band H is soldered tightly to the can at both its top and bottom edges, so that no liquid can get in between the can and its band. The bottom band, K, has a similar bead or groove to receive and to protect the bottom seam, $f'$. All the rest of this band may be cylindrical. The bead acts as a protector to the seam which it covers, and also serves to resist the force or the effects of the blow, when, as in daily use, the cans are thrown violently against each other. They also serve equally well to protect the seams of other cans whose seams are not made double.

From the above it will be seen that, in addition to the usual strength and value due to the outwardly-projecting seams, I also get the strength and resisting power due to the arch or rib form of the bead $i$, and which projecting bead also on its concave side lies directly against such seam, so that, in fact, it is next to impossible that the blows to which a can is subjected can break open a joint, this resisting power being made up and being the aggregate of, first, the arch or curve of the can-body; secondly, the outwardly-projecting seam; thirdly, the arch or curve of the band; fourthly, the transverse arch of the bead of this band; fifthly, the lengthwise curve of the bead; sixthly, the close contact of this bead with the projecting seam; seventhly, the conical part of the band, and as secured to the conical top, and, eighthly, the close soldering of the band to the can.

The vertical projecting seam $g$, I prefer to protect by a vertical strip, $m$, having about centrally a bead or grooved rib, $i$, such as above described. I adapt this strip to the curved form of the can and solder it thereto at its edges.

I make no claim to an outwardly-projecting folded seam; but I claim—

1. A milk-can having in combination with its outwardly-projecting folded seam a re-enforcing outer band made with an annular outwardly-projecting bead, as set forth, adapted to receive such seam, such band being applied to the can and seam, substantially as set forth.

2. In combination with a can having a conical top, and an outwardly-projecting seam connecting such top to the body of the can, a re-enforcing outer band made with an annular outwardly-projecting bead adapted to such seam as set forth and with a conical portion projecting above such bead, the whole applied to the body of the can and its top, as set forth.

3. In a can having a vertical outwardly-projecting folding seam, a re-enforcing strip, $m$, provided with an outwardly-projecting bead or grooved rib, as described, adapted to cover and protect such seam and applied to the can, as set forth.

FRANK P. SHEPHERD.

Witnesses:
M. O. SOUTHWORTH,
GEORGE HOAGLAND.